(12) United States Patent
Wang

(10) Patent No.: US 11,542,087 B2
(45) Date of Patent: Jan. 3, 2023

(54) REUSABLE PACKING BOX

(71) Applicant: Shiliang Wang, Rancho Santa Margarita, CA (US)

(72) Inventor: Shiliang Wang, Rancho Santa Margarita, CA (US)

( * ) Notice: Subject to any disclaimer, the term of this patent is extended or adjusted under 35 U.S.C. 154(b) by 0 days.

(21) Appl. No.: 16/764,374

(22) PCT Filed: Nov. 27, 2018

(86) PCT No.: PCT/CN2018/117570
§ 371 (c)(1),
(2) Date: May 14, 2020

(87) PCT Pub. No.: WO2019/114535
PCT Pub. Date: Jun. 20, 2019

(65) Prior Publication Data
US 2020/0399041 A1 Dec. 24, 2020

(30) Foreign Application Priority Data
Dec. 11, 2017 (CN) .......................... 201711306267.3

(51) Int. Cl.
*B65D 81/05* (2006.01)
*B65D 25/20* (2006.01)
*B65D 25/10* (2006.01)
*B65D 43/02* (2006.01)

(52) U.S. Cl.
CPC ......... *B65D 81/052* (2013.01); *B65D 25/205* (2013.01); *B65D 25/10* (2013.01); *B65D 43/02* (2013.01); *B65D 2581/053* (2013.01)

(58) Field of Classification Search
CPC .... B65D 81/052; B65D 25/205; B65D 25/10; B65D 43/02; B65D 2581/053
USPC ......................................................... 206/522
See application file for complete search history.

(56) References Cited

U.S. PATENT DOCUMENTS

| | | | | |
|---|---|---|---|---|
| 5,217,131 A | * | 6/1993 | Andrews | B65D 81/052 206/522 |
| 6,513,658 B1 | * | 2/2003 | Adkins | B65D 81/052 206/522 |
| 7,931,402 B1 | * | 4/2011 | Oas | B65D 81/052 383/3 |
| 9,174,787 B2 | * | 11/2015 | Scarbrough | A45C 7/0081 |
| 2002/0070566 A1 | * | 6/2002 | Hudson | A44B 19/301 292/315 |

(Continued)

FOREIGN PATENT DOCUMENTS

| CN | 104308819 | 1/2015 |
|---|---|---|
| CN | 205499797 | 8/2016 |

(Continued)

*Primary Examiner* — Steven A. Reynolds
(74) *Attorney, Agent, or Firm* — Innovent Law, P.C.; Karima Gulick

(57) ABSTRACT

Provided is a reusable packing box, comprising a protective box body (1) enclosed by a bottom surface and a plurality of slanted side walls, and an elastic inflatable layer (3) adhered to an inner side of the protective box body, wherein the elastic inflatable layer (3) is provided with a vent (4), and the vent (4) is embedded in the protective box body (1). The reusable packing box can reuse a packaging material and a filling material, thereby reducing the phenomenon of waste, and improving the management efficiency.

7 Claims, 6 Drawing Sheets

(56) References Cited

U.S. PATENT DOCUMENTS

2014/0262904 A1* 9/2014 Young ................ B65D 75/5811
206/459.5

FOREIGN PATENT DOCUMENTS

| CN | 206172198 | 5/2017 |
| CN | 107856987 | 3/2018 |
| CN | 207618296 | 7/2018 |
| WO | WO941809 | 8/1994 |
| WO | WO2014131137 | 9/2014 |

* cited by examiner

REUSABLE PACKING BOX

TECHNICAL FIELD

This utility model involves a technology of the packaging field, and specifically to a type of reusable packing box.

PRIOR ART

Today, online shopping is flourishing, giving us extreme convenience. Most online-purchased goods use cardboard boxes for ease of shipping. To ensure the safety of the goods in the transport process, various filler materials are often placed in cardboard boxes such as waste newspaper, bubble wrap, shock-absorbing air column bags, and the like. However, most packaging that includes a cardboard box therein, and filler materials are difficult to reuse, and therefore severely wasteful of resources, placing enormous pressure on the environment.

The use of cardboard boxes also has the following drawbacks, including: 1) Non-uniform dimensions, chaotic stacking during the transport process, inability to rationally utilize space and perform fine management; 2) Lack of waterproofing function, and the products being susceptible to dampness; 3) Having a limited capacity to withstand gravity and shock, damaging the goods inside; 4) The delivery address and QR code attachment sites differing, and needing to be searched for during express sorting, taking a lot of time; 5) Procedures during box packaging being complicated, and wasting a lot of time.

CONTENT OF UTILITY MODEL

This utility model, with regard to said existing drawbacks, provides a reusable packing box capable of packaging material and filling material re-use, reducing waste phenomena, and enhancing management efficiency.

This utility model, is achieved through the following technical scheme:

This utility model includes a protective box body composed of a bottom surface and multiple sloped sidewalls as well as an elastic air-filled layer laminated on the inside of the protective box body, said elastic air-filled layer is set with an air hole and said air hole is inlaid on said protective box body.

Said protective box body is set with a marking area, and the inside of said marking area is set with a QR code, and said QR code is able to record protective box body information and data on the goods kept therein as well as the recipient, providing logistics system tracking. Said protective box body information may be the package color, material, and dimensions, as well as the elastic air-filled layer material and the like. Said stored goods and recipient information may be the product weight, recipient information, and the like.

Preferably, the top opening of said protective box body is arranged with a separable box cover, said separable box cover is laminated on the inner sides with an elastic protective body, the side walls of said protective body are extended to the outside at the top opening and form a convex ridge. Said separable box cover is set on the outside with a fastening belt fixing seat, said fastening belt fixing seat has retractable fastening belts set at the various corners of the opening of the protective box body, the ends of said retractable fastening belts are fixed to corner elements at the box corners, and said corner elements at the box corners fit into the corners and convex ridges of the protective box body opening, thereby sealing the packing box.

Said side walls are set with a box cover boss at the top of the inside of the protective box body in order to place the separable box cover, and preferably, when said corner elements at the box corners are fitted onto the convex ridge, the horizontal planes of both the corner elements at the box corners and the separable cover become parallel.

Said elastic protective body is able to adopt a shock-absorbing air column bag and is able to adopt an elastic air-filled layer similar to the type on the inside of the protective box body.

Preferably, said protective box body includes rotary connectors on one side, the upper box body to the lower box body mating on the remaining sides, and the upper box body and lower box body being closed and sealed by a zipper.

Preferably, the top of the upper box body and lower box body of the mating sides are set with a latch assembly; and more preferably, said latch assembly is a pin and sealing strip.

Preferably, the upper box body and lower box body are connected via a leaflet element on the rotary side; and more preferably, the air hole of said elastic air-filled layer is set between two leaflet elements on the rotary side.

Said air hole can adopt a unitary air filling and air discharging air hole, and can also adopt independent air filling and air discharging air holes, and work is performed in combination with an air pump, raising the work efficiency. Said elastic air-filled layer can use a plastic or resin, utilizing the top of the elastic air-filled layer to hold an object, achieving an object fixing effect, while at the same time providing vibration resistance, and even temporary insulation functions; The amount of air filling is decided by the volume of the goods packaged.

In this utility model, according to the requirements of express goods, the packing box material can be a light general-use plastic, engineering plastic, and can even be an aerospace alloy, and can withstand greater shock forces than can cardboard boxes, and have such characteristics as water resistance, wear resistance, and the like; At the same time, because of the differences in load capacity, packing boxes of similar external dimensions can be differently classified, and the materials, box wall thicknesses, and elastic air-filled layer materials of the packing boxes will correspondingly vary according to the different classifications.

The packing box in this utility model can be divided into multiple grades, and can adopt colors for additional classification, with specific types such as: Fragile goods, overweight goods, normal goods, express goods, and the like, are respectively differentiated using different colors, while having different material thickness and load weight requirements for each type of color. This achieves respective treatment of various types of goods in transport, is not prone to damaging the goods, and operators are able to find out the goods' properties and weight during the operation process, and are able to pay particular attention and save time.

Technical Effect

Compared to the current art, this utility model has the following advantages:

1) The various components of the packing box can be recycled, reducing resource waste and environmental pollution;

2) The packing box uses a plastic or alloy material, and is set with an elastic air-filled layer protecting the goods, effectively protecting from vibration while at the same time being able to protect from water, making the stored product be not susceptible to moisture;

3) When the empty box is transported, the protective box body is opened, and protective box bodies of similar dimensions can be stably stacked, saving space;

4) Protective box bodies of the same external dimensions can be fabricated using different-colored plastics according to the product characteristics, such as: weight (normal, overweight), express speed (normal, express, special express), and product storage requirements (normal, fragile, stacked storage direction), for ease of classification during work. Differentiation work for packing boxes of different external dimensions uses color to differentiate protective box bodies of different external dimensions, saving time and work volume, and improving management efficiency;

5) For packing boxes of plastic materials, it is also possible to fabricate a transparent protective box body for ease of supervision and inspection.

Figure 1:
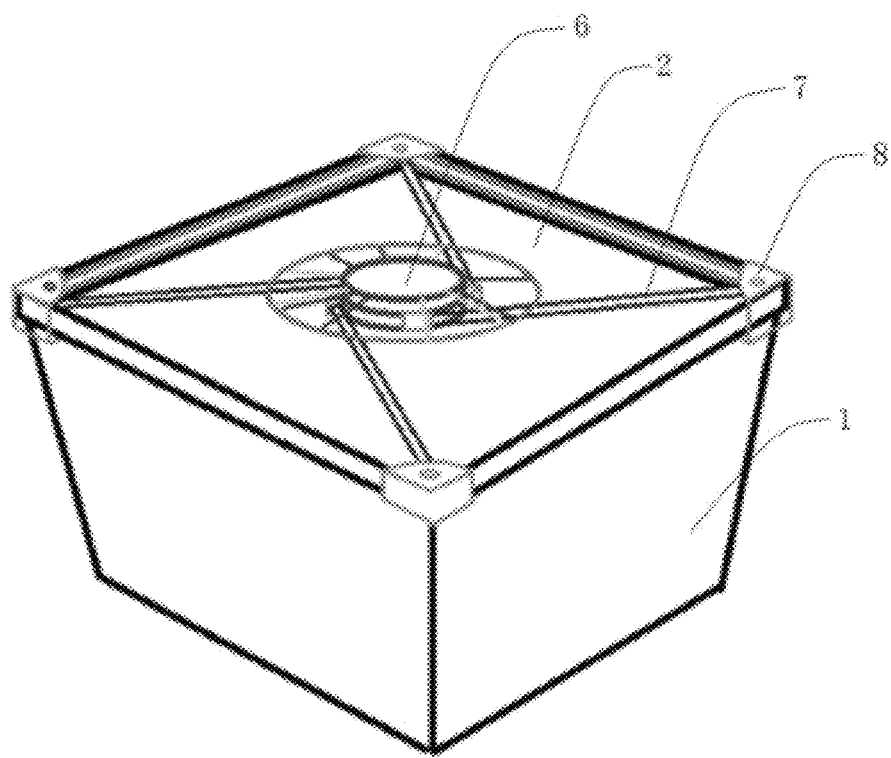
FIG. 1 is a schematic of the overall structure of Embodiment 1.

In the figures: Protective box body 1, separable box cover 2, elastic air-filled layer 3, air hole 4, convex ridge 5, fastening belt fixing seat 6, retractable fastening belt 7, corner element 8 at the box corners, box cover boss 9, upper protective box body 10, lower protective box body 11, zipper 12, bolt 13, sealing strip 14, leaflet assembly 15.

SPECIFIC MODES OF IMPLEMENTATION

The following implements a detailed description of this utility model in combination with the figures and the specific implementations.

Embodiment 1

Figure 5:
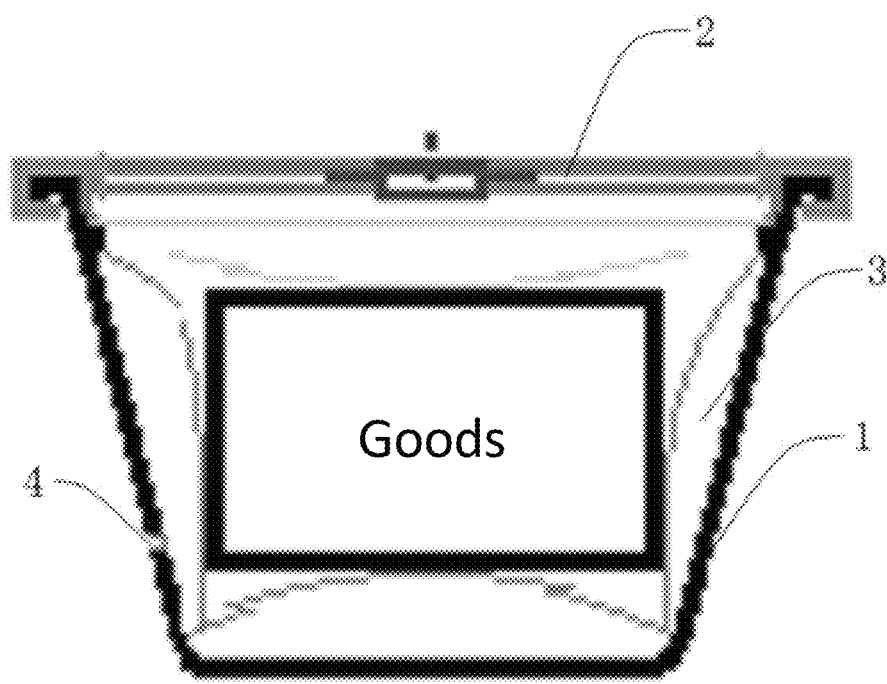
FIG. 5 is a schematic diagram of the loaded goods in Embodiment 1.

As shown in FIG. 1 and FIG. 5, the packing box of this embodiment is narrow at the bottom and wide at the top, and includes a protective box body 1 composed of a bottom surface and four multiple sidewalls as well as an elastic air-filled layer 3 laminated on the inside of the protective box body 1, said elastic air-filled layer 3 being set with an air hole 4, and said air hole 4 being inlaid on said protective box body 1.

Figure 3:
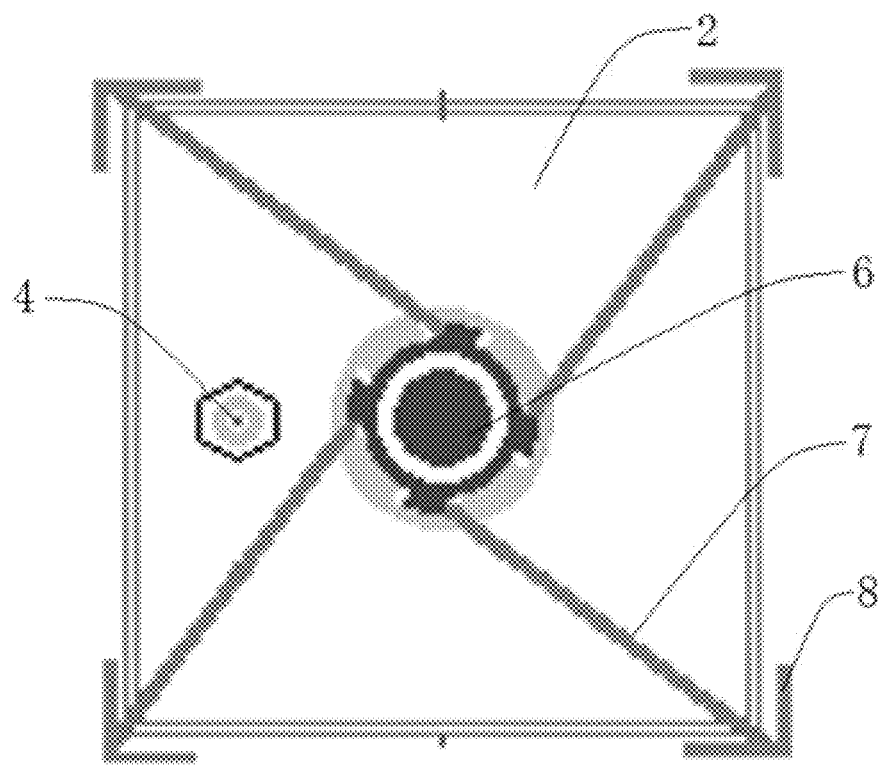
FIG. 3 is a top view of Embodiment 1.
Figure 4:
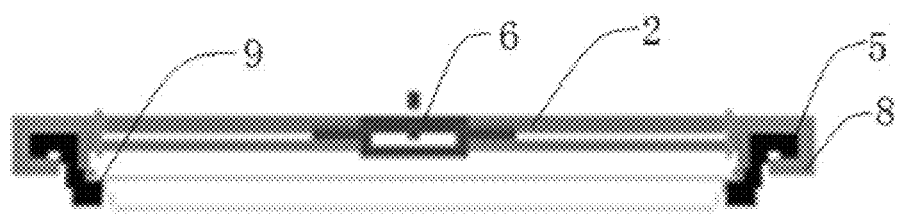
FIG. 4 is a structural schematic diagram of the separable box cover of Embodiment 1.
Figure 6:
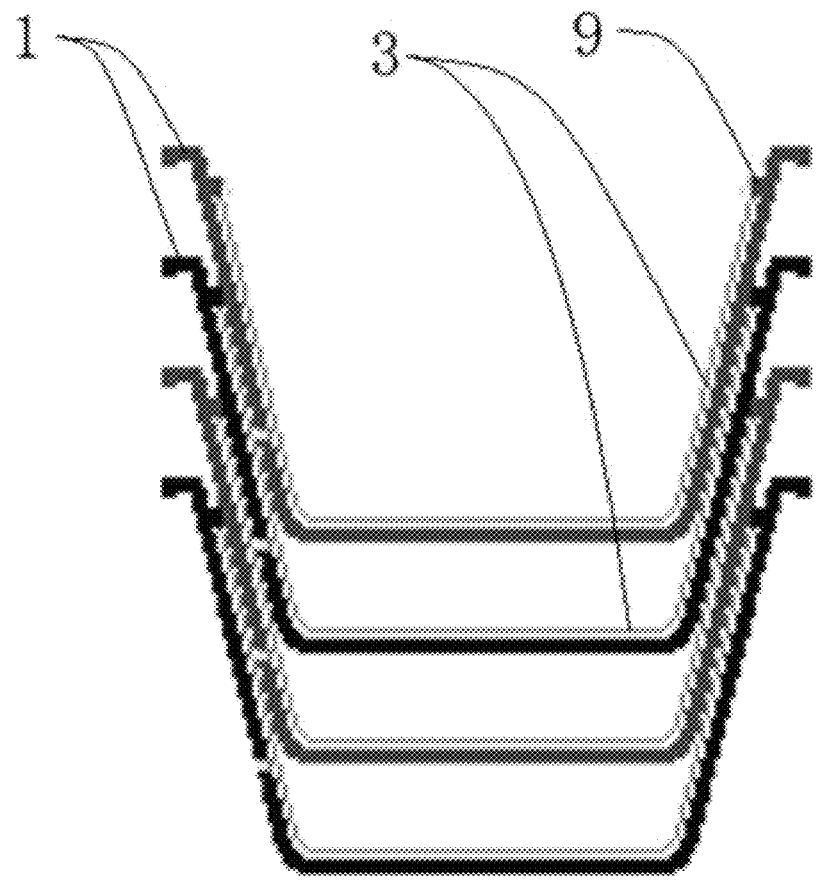
FIG. 6 is a schematic diagram of the stacked storage of open boxes in Embodiment 1.
Figure 7:
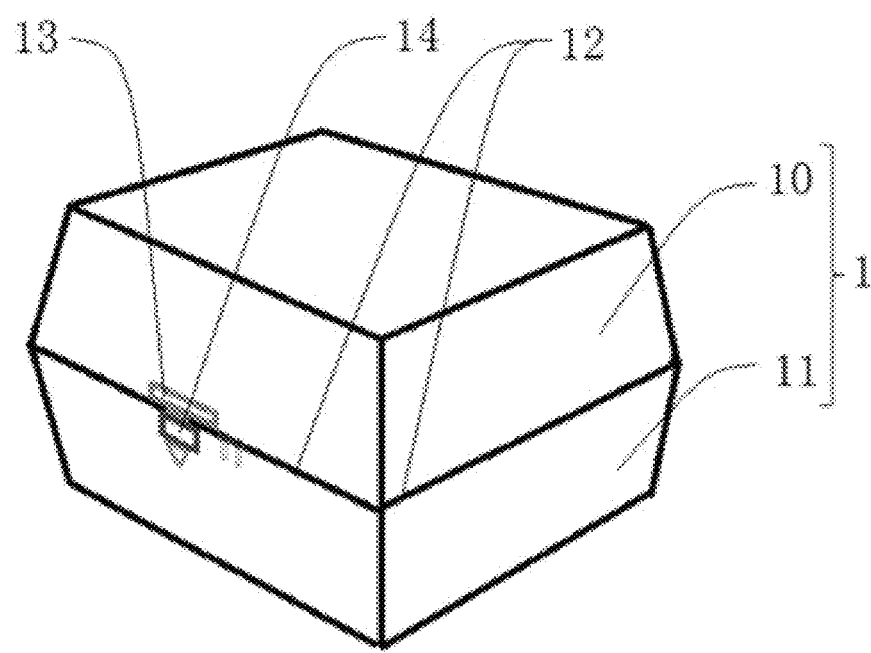
FIG. 7 is a schematic of the overall structure of Embodiment 2.

As shown in FIG. 3, FIG. 4, and FIG. 6, the top opening of said protective box body 1 is arranged with a separable box cover 2, and protective box bodies 1 of the same external dimensions can be stacked together when not loaded with products, thereby raising the space utilization rate. The side walls of said protective box body 1 are extended to the outside at the top opening and form a convex ridge 5; said separable box cover 2 is set on the outside with a fastening belt fixing seat 6, said fastening belt fixing seat 6 has retractable fastening belts 7 set at the various corners of the opening of the protective box body 1, the ends of said retractable fastening belts are fixed to corner elements 8 at the box corners, and said corner elements 8 at the box corners fit into the corners and convex ridges 5 of the protective box body opening, thereby sealing the packing box.

Preferably, said fastening belt fixing seat 6 is connected to the separable box cover 2 using screws, and a rotary handle is set at the top of the fastening belt fixing seat 6, and the screw-in depth is adjusted via the rotary handle, controlling the degree of tension of the retractable fastening belt 7, making the protective box body 1 fix tightly to the separable box body.

Figure 2:
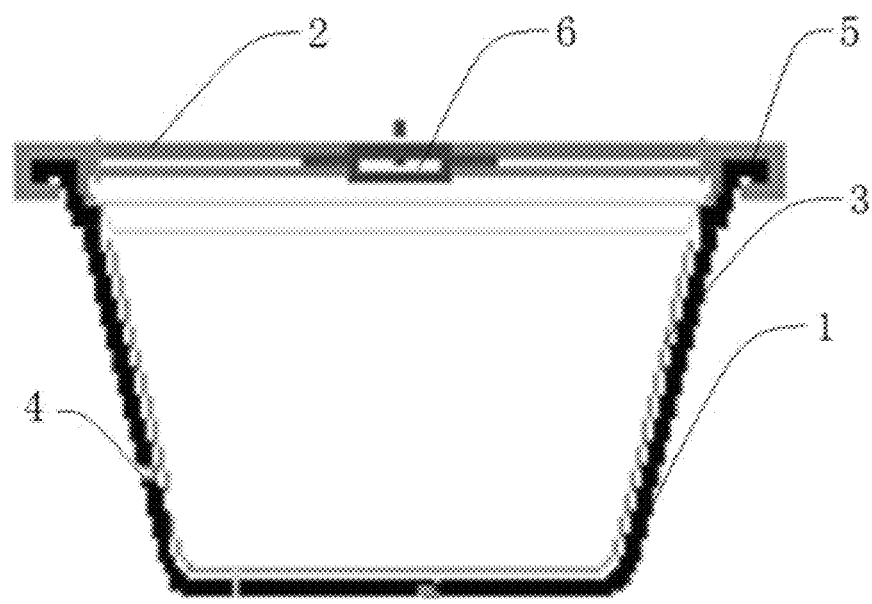
FIG. 2 is an internal structural diagram of Embodiment 1.

As shown in FIG. 2, FIG. 4, and FIG. 6, said side walls are set with a box cover boss 9 at the top of the inside of the protective box body 1 in order to place the separable box cover 2, and preferably, when said corner elements 8 at the box corners are fitted onto the convex ridge 5, the horizontal planes of both the corner elements 8 at the box corners and the separable cover 1 become parallel.

Even more preferably, an elastic protective body is adhered to the inside of said separable box cover.

Said elastic protective body is able to adopt a shock-absorbing air column bag and is able to adopt an elastic air-filled layer 3 similar to the type on the inside of the protective box body 1.

This embodiment has corresponding modes of operation depending on changes in the specific structure:

1) The separable box cover 2 adopts a shock-absorbing air column bag, and so the goods loaded must be placed within the protective box body 1, covered with the separable box cover 2, and the corner elements 8 at the box corners fitted onto the convex ridge 5, and filled with a suitable volume of air until the elastic air-filled layer 3 firmly holds the goods to the shock-absorbing air column bag, and the operation is reversed to remove the goods;

2) The separable box cover uses an elastic air-filled layer 3, therefore a small volume of air is filled onto the elastic air-filled layer 3 of the separable box cover 2, covering the separable box cover 2, and fitting the corner elements 8 at the box corners to the convex ridge 5, then a suitable volume of air is filled into the elastic air-filled layers 3 of the protective box body and the separable box cover, for ease of fixing the goods to the elastic air-filled layer 3; the operation is reversed to remove the goods.

Embodiment 2

As shown in FIG. 7, FIG. 8, FIG. 9, FIG. 10, and FIG. 12, the packing box in this embodiment includes a rotary connection on one side, and the upper box body 10 and lower box body 11 latched on the remaining side, and the upper box body 10 and lower box body 11, and the upper box body 10 and lower box body 11 are closed and sealed by a zipper 12, and protective box bodies 1 of the same dimensions can have the upper box bodies 10 and lower box bodies 11 respectively stacked together when not loaded with goods so as to increase the spatial utilization rate.

Figure 8:
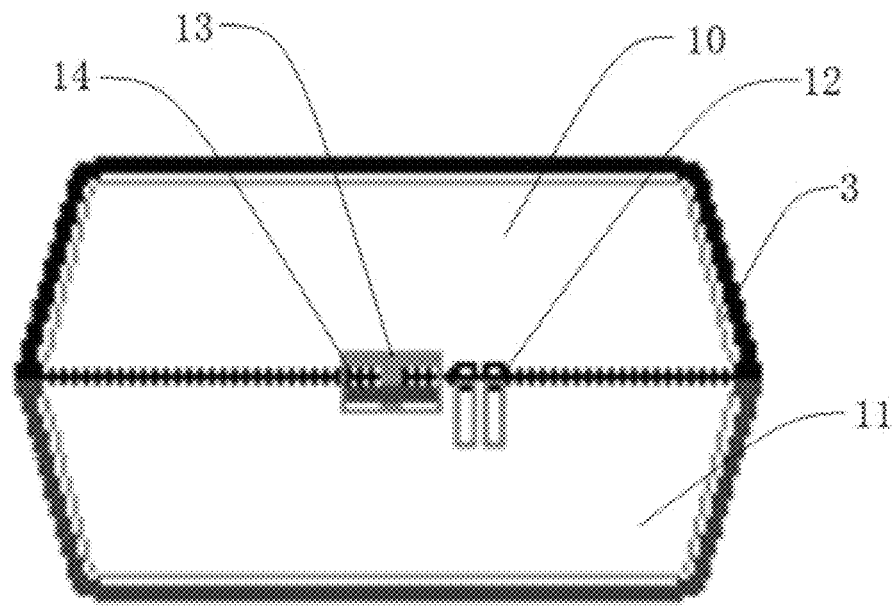
FIG. 8 is a structural schematic diagram of the protective box body latch side of Embodiment 2.
Figure 9:
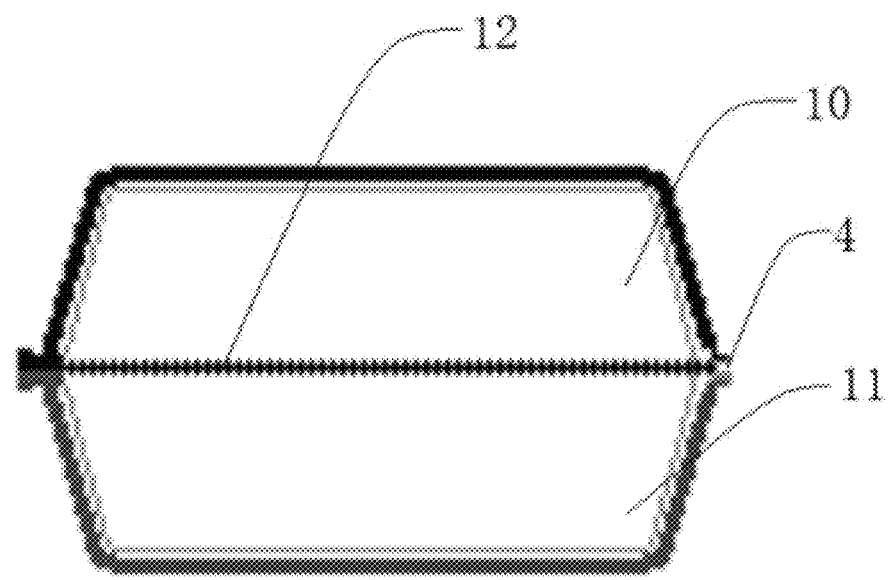
FIG. 9 is a side view of Embodiment 2.

As shown in FIG. 8, the top of the upper box body 10 and lower box body 11 of the mating sides are set with a latch assembly; and more preferably, said latch assembly is a pin and sealing strip.

Figure 10:
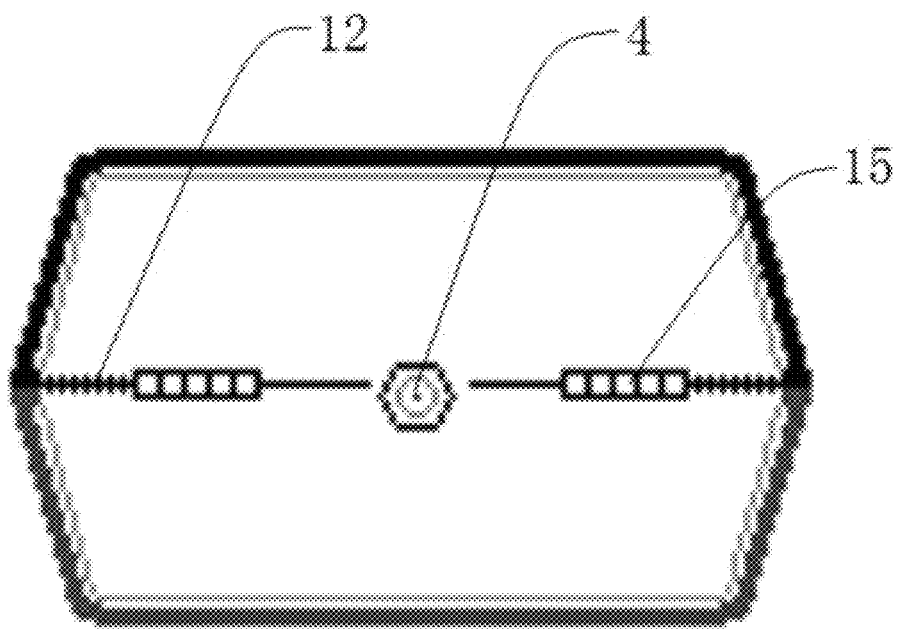
FIG. 10 is a structural schematic of the rotation side of Embodiment 2.

As shown in FIG. 10, the upper box body 10 and lower box body 11 are connected via a leaflet element 15 on the rotary side; and more preferably, the air hole 4 of said elastic air-filled layer 3 is set between two leaflet elements 15 on the rotary side.

Figure 11:
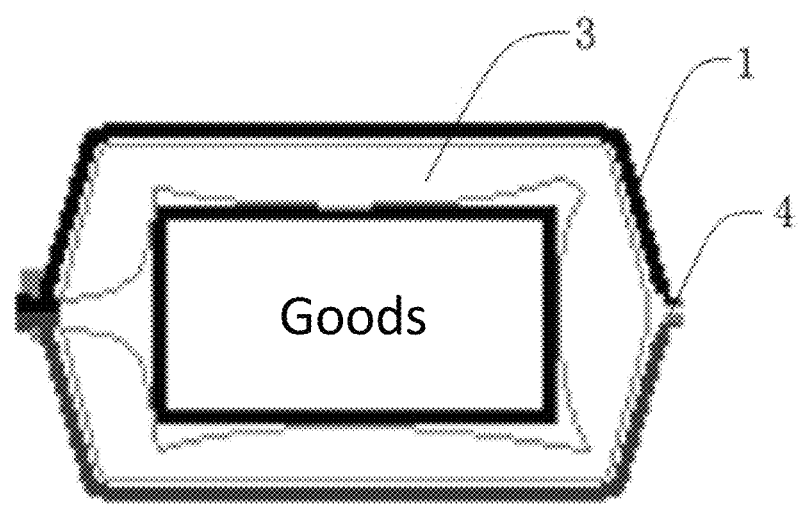
FIG. 11 is a schematic of the loaded goods of Embodiment 2.
Figure 12:
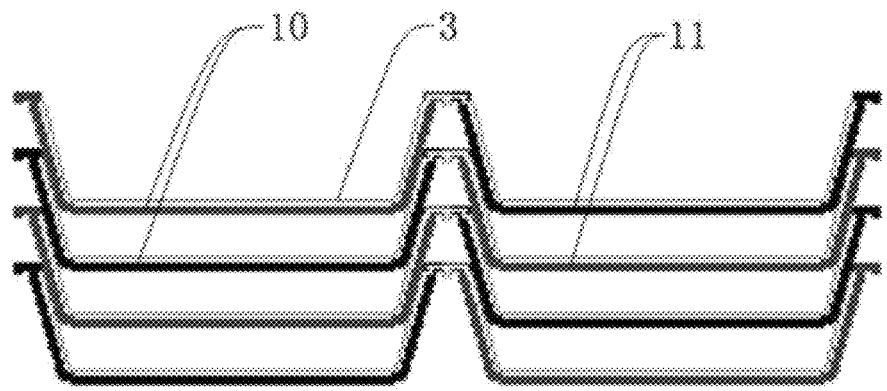
FIG. 12 is a schematic diagram of the stacked storage of open boxes in Embodiment 2.

As shown in FIG. 11, the packing box of this utility model exhibits a hamburger box shape, and after the upper box body 10 and lower box body 11 are closed, the zipper 12 is pulled up, locking the latch 13 and the seal strip 14, and a suitable amount of air filled via the air hole 4 making the elastic air-filled layer 3 expand and firmly hold the goods, and the operation is reversed to remove the goods.

It must be emphasized that the above is merely a more-preferred embodiment, the shape, etc., of the protective box body 1 is not particularly limited with relation to any of the shapes of this utility model, and all simple modifications, equivalent changes, and decorations performed on the above embodiments according to the technical substance of this utility model shall still be within the scope of the technical scheme of this utility model.

The invention claimed is:

1. A reusable packing box characterized by the inclusion of a rigid protective box body composed of:
   an upper box body and a lower box body;
   a bottom surface and multiple sloped sidewalls as well as an elastic air-filled layer laminated on the inside of the protective box body, said elastic air-filled layer being set with an air hole and said air hole being inlaid on said protective box body, wherein said air hole is located at a rotary side connecting the upper box body and the lower box body, and wherein upon inflation, air fills space between the elastic air-filled layer and each of the multiple sloped sidewalls of the protective box body;
   a hinge element configured to connect the upper box body and the lower box body on the rotary side; wherein
   said air hole is a unitary air hole allowing air inflation and air discharge;
   a seal strip including a first seal strip disposed on the upper box body of the reusable box and a second seal strip disposed on the lower box body of the reusable box;
   a zipper configured to connect the upper box body and the lower box body by coupling the first seal strip with the second seal strip; and
   a latch disposed on the reusable box and near the seal strip, wherein the zipper is configured to be fitted in the latch to lock the seal strip.

2. A reusable packing box as described in patent claim 1 characterized by said protective box body including rotary connectors on the rotary side, the upper box body mating to the lower box body are closed and sealed to one another on the remaining sides by the zipper.

3. A reusable packing box as described in patent claim 2 characterized by the top of the upper box body and lower box body of the mating sides being set with the latch; and the latch being a pin and sealing strip.

4. A reusable packing box as described in patent claim 2 characterized by the air hole of said elastic air-filled layer being set between the rotary connectors on the rotary side.

5. A reusable packing box as described in patent claim 1 characterized by the material of said packing box being any type of general-purpose plastic, engineering plastic, or an aerospace alloy.

6. A reusable packing box as described in patent claim 1 wherein upon a deflation through said air hole, air is removed from each of the multiple sloped sidewalls of the protective box body.

7. A reusable packing box characterized by the inclusion of a rigid protective box body composed of:
   an upper box body and a lower box body;
   a bottom surface and multiple sloped sidewalls as well as an elastic air-filled layer laminated on the inside of the protective box body, said elastic air-filled layer being set with an air hole and said air hole being inlaid on said protective box body, wherein said air hole is located at a rotary side connecting the upper box body and the lower box body, and wherein upon inflation, air fills space between the elastic air-filled layer and each of the multiple sloped sidewalls of the protective box body; and
   two hinge elements configured to connect the upper box body and the lower box body on the rotary side; wherein
   said air hole is a unitary air hole allowing air inflation and air discharge, the air hole of said elastic air-filled layer being set between the two hinge elements on the rotary side;
   a seal strip including a first seal strip disposed on the upper box body of the reusable box and a second seal strip disposed on the lower box body of the reusable box;
   a zipper configured to connect the upper box body and the lower box body by coupling the first seal strip with the second seal strip; and
   a latch disposed on the reusable box and near the seal strip, wherein the zipper is configured to be fitted in the latch to lock the seal strip.

* * * * *